(12) United States Patent
Gianchandani et al.

(10) Patent No.: US 8,638,106 B2
(45) Date of Patent: Jan. 28, 2014

(54) MICRODISCHARGE-BASED PRESSURE SENSOR AND METHOD

(75) Inventors: Yogesh B. Gianchandani, Ann Arbor, MI (US); Scott Andrew Wright, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 652 days.

(21) Appl. No.: 12/789,601

(22) Filed: May 28, 2010

(65) Prior Publication Data

US 2011/0128010 A1    Jun. 2, 2011

Related U.S. Application Data

(60) Provisional application No. 61/183,056, filed on Jun. 1, 2009.

(51) Int. Cl.
*G01L 21/30* (2006.01)

(52) U.S. Cl.
USPC .......................................... 324/460; 324/459

(58) Field of Classification Search
None
See application file for complete search history.

(56) References Cited

U.S. PATENT DOCUMENTS

| 4,932,262 | A | 6/1990 | Wlodarczyk | |
|---|---|---|---|---|
| 6,341,526 | B1 | 1/2002 | Castracane et al. | |
| 6,657,370 | B1 * | 12/2003 | Geusic | 313/356 |
| 2002/0186017 | A1 * | 12/2002 | Liebeskind | 324/460 |
| 2009/0072836 | A1 * | 3/2009 | Choi et al. | 324/460 |

OTHER PUBLICATIONS

International Search Report for PCT/US101036522, dated Jan. 18, 2011, 3 pages.

* cited by examiner

*Primary Examiner* — Minh N Tang
(74) *Attorney, Agent, or Firm* — Reising Ethington P.C.

(57) ABSTRACT

A microdischarge-based pressure sensor that includes an anode, two cathodes, a drive circuit connected to the electrodes, and a measurement circuit that permits sensing of transient current pulses flowing through at least one of the electrodes. One of the cathodes is interposed between the anode and other cathode, and it includes a central opening which permits a microdischarge to occur between the anode and each cathode in response to applied voltage pulses from the drive circuit. Changes in relative current between the two cathodes are indicative of changes in ambient pressure in the microdischarge chamber. In other embodiments, a sealed chamber can be used with one of the electrodes acting as a diaphragm which deflects based on external pressure and changes its inter-electrode spacing, thereby altering the relative cathode currents.

7 Claims, 12 Drawing Sheets

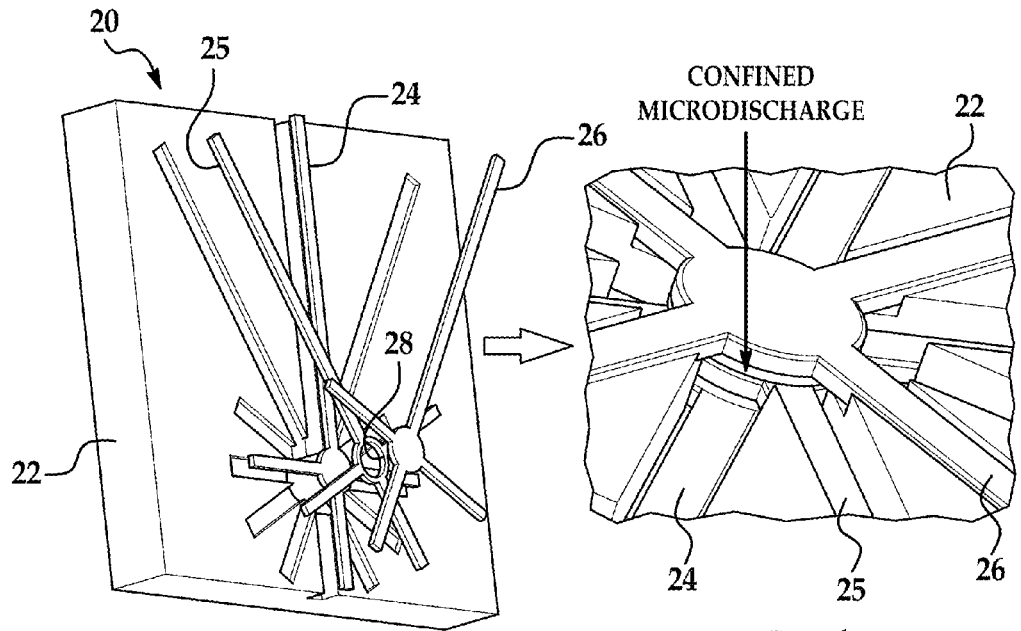
FIG. 1a
FIG. 1b
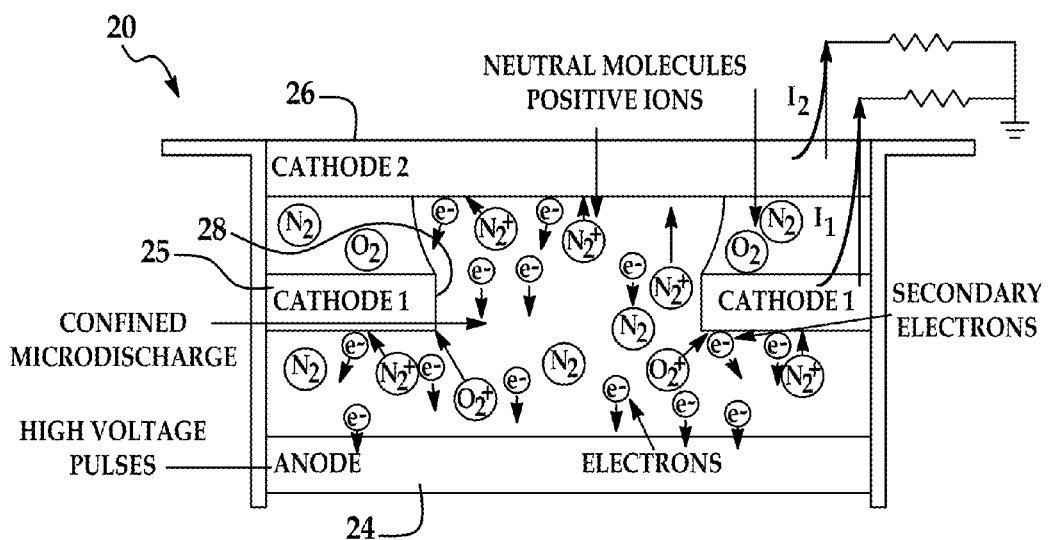
FIG. 2

MICRODISCHARGE-BASED PRESSURE SENSOR AND METHOD

CROSS-REFERENCE TO RELATED APPLICATION

This application claims the benefit of U.S. Provisional Application No. 61/183,056, filed Jun. 1, 2009, the entire contents of which are hereby incorporated by reference.

This invention was made with government support under grants EEC0233187, EC9986866, and ECS0734962 awarded by the National Science Foundation. The government has certain rights in the invention.

TECHNICAL FIELD

This invention relates generally to pressure sensors and MEMS devices and, more particularly, to techniques and devices for measuring pressure in high-temperature environments using microdischarge plasmas.

BACKGROUND OF THE INVENTION

Pressure sensors that can operate at high temperatures have uses in numerous industrial sectors, and have been used in gas turbine engines, coal boilers, furnaces, and machinery for oil/gas exploration. A number of optical approaches have been reported in the past, utilizing Fabry-Perot and other interferometers. Typically, these use an optically reflective cavity on the end of a fiber optic cable; the cavity size changes with pressure, causing measurable interference changes in reflected light. A thin diaphragm is typically used as the reflective surface. Operating temperatures up to 800° C. have been achieved with sapphire membranes. An interferometer-based sensor has also been fabricated inside a fiber optic cable. Another sensing technology uses Bragg gratings, which are photo inscribed into fibers, and used to trace wavelength shifts caused by pressure and temperature changes at temperatures exceeding 350° C., and potentially over 1,500° C. Piezoresisitve pressure sensors with diaphragms made from silicon carbide, and more recently even Si, have been reported to operate at 600° C. Sapphire membranes have also been used in this context.

Microdischarge-based pressure sensors can complement this portfolio by offering an electrical transduction and structural simplicity. Microdischarges are miniature, localized plasmas (and may include, more generally, arcs or sparks) created in gas ambients between electrodes which, due to their size, demonstrate characteristics different from those of plasma regions created on a larger scale. Microdischarges have been explored for applications in a variety of micro total analysis systems, including microscale optical emission spectroscopy systems for chemical sensing. Devices utilizing microdischarges are well suited for high temperature operation as the electrons have average thermal energies exceeding 3 eV (34,815 K) away from the cathode and small populations of very high energy electrons with thermal energies exceeding 400 eV near the cathode. Ions have thermal energies exceeding 0.03 eV above ambient (644 K) in a 23° C. (296 K) ambient environment. These temperatures allow the species to be only minimally affected by a high or low temperature ambient, making it possible for microdischarge-based devices to operate at temperatures in excess of 1,000° C. and potentially down to cryogenic temperatures. The targeted performance range for this work is 200-1,000° C., but some baseline studies at room temperature are included. With regard to pressure sensors, microdischarge-based devices offer the possibility of structural simplicity and a direct electrical readout.

Microdischarge-based pressure sensors of the type disclosed herein operate by measuring the change in spatial current distribution of microdischarges with pressure. The targeted pressure range is 10-2,000 Torr, as might be encountered in a variety of manufacturing applications. Pressures outside of this range can also be measured. Additionally, pressures within this range have not been conventionally measured by technologies involving discharges-based devices. As gas pressure increases, the mean free path of ionized molecules is reduced and consequently, the breakdown and discharge characteristics are altered. Microdischarge-based pressure sensors are fundamentally different than ion gauges, which are not effective at atmospheric pressure because the small mean free path of the created ions, 20-65 nm, makes them difficult to detect at the collector.

A microdischarge-based pressure sensor using a planar electrode structure is known from the inventors' prior work published in *A Harsh Environment, Multi-Plasma Microsystem With Pressure Sensor, Gas Purifier, and Chemical Detector*, Proc. IEEE Int. Conf Micro Electro Mech. Syst., Kobe, Japan, 2007, pp. 115-118. The pressure sensor disclosed in this article utilizes a single circular planar anode partially surrounded by concentric cathodes. All of the electrodes are formed as thin-film coplanar elements on a glass substrate. Short duration dc pulses are applied to create pulsed microdischarges between the anode and all of the cathodes, and the current distribution between two cathodes is measured and used to determine ambient pressure.

SUMMARY

In accordance with one embodiment of the invention, there is provided a microdischarge-based pressure sensor, comprising a plurality of electrodes, a drive circuit connected to the electrodes, and a measurement circuit that permits sensing of transient current pulses flowing through at least one of the electrodes. The electrodes include an anode having a first planar surface and a cathode having a second planar surface disposed in a parallel, spaced relationship relative to the first planar surface. The anode and cathode are sized such that a microdischarge chamber exists between the anode and cathode having a generally uniform gap spacing across the first and second planar surfaces. In some embodiments, the cathode can be a first cathode having a central opening, and the sensor can include a second cathode spaced farther from the anode such that the first electrode is located between the anode and second electrode. The opening in the first cathode permits a microdischarge between the anode and each cathode. The drive circuit is operable to apply voltage pulses to the electrodes sufficient to cause the microdischarge.

In accordance with another embodiment of the invention, there is provided a microdischarge-based pressure sensor that includes a first electrode and a second electrode spaced from the first electrode by a gap spacing that permits a microdischarge between the electrodes. At least one of the electrodes is at least partially movable relative to the other of the electrodes in response to changes in applied pressure, whereby the gap spacing varies with applied pressure.

In accordance with another embodiment of the invention, there is provided a method of measuring pressure. The method includes the steps of creating a microdischarge between two electrodes, sensing emitted radiation from the microdischarge, and determining a pressure reading based on the sensed radiation.

BRIEF DESCRIPTION OF THE DRAWINGS

FIGS. 1a and 1b together comprise FIG. 1 in which FIG. 1a is a perspective, exploded view of a first embodiment of a microdischarge-based pressure sensor showing an anode and two cathodes as they are assembled into a quartz substrate, which FIG. 1b showing an enlarged, fragmentary view of the pressure sensor of FIG. 1a in operation after the electrodes have been assembled into the quartz substrate;

FIG. 2 is a diagrammatic view of a cross-section of the pressure sensor of FIG. 1 showing electron and ion transport during operation of the sensor;

FIG. 8b is a plot of the terms $C_1$ and $C_2$ for equation (5) relating to the total cathode peak current from the fabricated pressure sensor measured for the graph of FIG. 8a;

DETAILED DESCRIPTION OF THE ILLUSTRATED EMBODIMENTS

Figure 3:
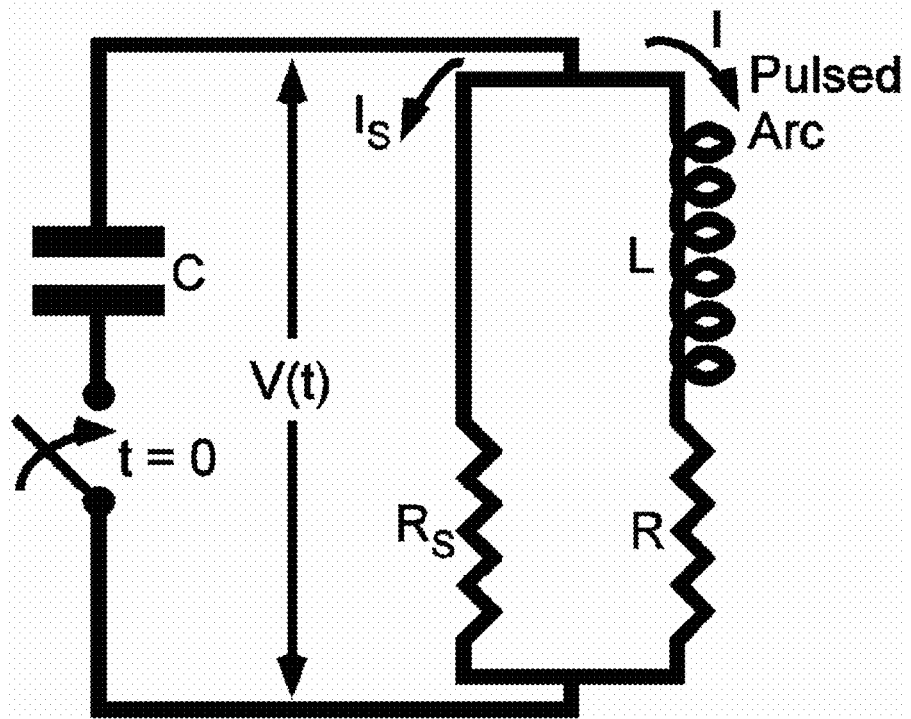
FIG. 3 is a schematic of a pulse circuit model of the sensor of FIG. 1.

The illustrated embodiments are directed to a microdischarge-based pressure sensor that utilizes a bulk foil microscale geometry having multiple cathodes that provide a differential current readout. The first embodiment discussed below uses metal foil electrodes in an anode and two-cathode stack within a quartz substrate for stress relief. This bulk foil sensor permits very high temperature operation. While the first embodiment is directed to use of a microdischarge pressure sensor in a nitrogen environment, subsequent embodiments described below are encapsulated for use in corrosive or liquid environments.

First Embodiment

FIG. 1 depicts the main components of a microdischarge pressure sensor 20 that includes a quartz chip substrate 22 and three electrodes including an anode 24, a first, middle cathode 25, and a second, upper cathode 26. These electrodes 24-26 are suspended over a cavity in the quartz chip 22. The quartz chip is a monolithic substrate that supports each of the electrodes at a desired spacing relative to the other electrodes. Each electrode 24-26 has a single lead for electrical contact and between one and three additional supports, which maintain the suspended position of the electrode. A microdischarge chamber exists in the center of the chip, in a through-hole, as shown in FIG. 1. The single anode electrode 24 is disk-shaped and serves as the bottom of the chamber while the center electrode 25 is annular, or torus-shaped, thereby having a central opening 28 that allows the discharges to exist between the bottom anode 24 and both cathodes 25, 26. The top cathode 26 is disk-shaped as well, confining the discharges. The electrodes can be of various sizes depending on the application; for example, for disk-shaped electrodes in the embodiment of FIG. 1, the electrodes can have a diameter up to about 3 mm. Other, non-circular shaped electrodes can be used as well. The volume and shape of the microdischarge chamber can be selected as suitable for the particular application to which the pressure sensor is put. In at least some embodiments, microdischarge chambers having volumes up to 7 mm$^3$ can be used; more typical embodiments might use a volume of about 0.5 mm$^3$.

Measured pressure is determined by applying a voltage between the anode 24 and the two cathodes 25, 26 and then separately reading the current flowing through each cathode. These current components are denoted as $I_1$ in the proximal cathode 25 (cathode 1) and $I_2$ in the distal cathode 26 (cathode 2). The differential current, expressed as a fraction of the total peak current, $(I_1-I_2)/(I_1+I_2)$, is treated as the sensor output. At low pressures, current favors the farthest cathode 26, while at high pressures, the opposite occurs. A benefit of using a differential output that is expressed as a fraction of the total is that the exact magnitudes are less important than fractional changes. This can be useful in eliminating common mode artifacts that might otherwise skew the sensor reading.

The basic operation of a DC microdischarge in the bulk foil sensor is illustrated in FIG. 2, indicating electron and ion transport. The electrons are drawn towards the anode, whereas the positive ions are drawn to the two separate cathodes. Upon cathode impact, the energetic ions eject high energy secondary electrons from the cathodes, which sustain the microdischarges by ionizing additional neutral molecules and continuing the breakdown process. High energy ions, high power densities, and high voltage gradients are encountered in microdischarges at pressures higher than one atmosphere. The current in each cathode is composed of a combination of positive ions impacting the cathodes from the microdischarge and secondary electrons ejected from the cathodes upon ion impact. Further away from the cathodes, the current is carried primarily by the faster moving electrons.

A. Modeling of the Bulk Foil Sensor

Power consumption and parasitic heating in the pressure sensors are controlled by using pulsed DC microdischarges, as opposed to constant DC discharges. The use of pulsed powering creates transient high current pulses (40-100 ns in duration), which initiate the microdischarges, is known. The magnitudes of the current pulses show much greater sensitivity to pressure than the sustained DC current levels. However, while steady state models exist for plasmas, models for transient current pulses in microscale discharges have not been reported.

Microdischarges differ from macroscale plasmas in several aspects. In general, microdischarges can be sustained at higher pressures. They also experience much higher power densities, voltage gradients, and electric field strengths. Despite the high rate of collisions encountered at pressures approaching atmosphere, the electrons are in non-equilibrium, as they have much higher energies than the ions. When operating as glow discharges, microdischarge ionization is based on the creation of high energy secondary electrons. A significant amount of these very energetic secondary electrons, "beam electrons", are accelerated to high velocities in the positively charged sheath region proximal to the cathode. This makes the models describing microdischarges complex, as the electron energy distribution function is highly non-Maxwellian. (The distribution function in macroscale discharges is typically assumed to be Maxwellian.) These differences between macroscale plasmas and microdischarges make the macroscale models unrepresentative of the microscale, even in steady-state conditions. Multi-electrode geometries, such as that shown in FIG. 1, pose additional challenges.

Several modeling techniques have been used to model steady state microdischarges, most of which concentrate on cylindrically symmetric structures with a central hole through a metal-dielectric-metal sandwich stack. Fluid models have been developed which solve continuity, flux, and energy equations for separate species in the microdischarges. One known 2-D fluid model takes into account both low energy "bulk" and high energy "beam" electrons and their position at various time steps. The model uses a Monte Carlo simulation to track the beam electrons, accounting for non-local plasma kinetics, collisionless heating, and non-equilibrium characteristics, which are pertinent to microdischarge operation. These are not considered in fluid models. Additional 1-D Monte Carlo models for steady state microdischarges have also been developed. It has been found that the peak electric field near the cathode is extremely high (over 80 kV/cm). The bulk electron temperature is found to be 5.5-6.0 eV near the cathode and 2-3 eV between the electrodes. In an argon microdischarge, the ion density is $2 \times 10^{13}$ cm$^{-3}$ at 50 Torr and $1.8 \times 10^{14}$ cm$^{-3}$ at 65 Torr, while densities up to $5 \times 10^{16}$ cm$^{-3}$ have been reported. The development of a 3-D Monte Carlo simulation would be useful, given the multiple path lengths and spatially varying non-uniform fields in microdischarges.

B. Current Pulse Operation and Simulation

The current pulses in cathodes 1 and 2 of a microdischarge-based pressure sensor such as the bulk foil sensor 20 of FIG. 1 are roughly approximated by a circuit model, which predicts the pulse profile in time as a function of discharge voltage. The pulse power source is represented by the discharging of a capacitor, C, while the discharge current pulse is represented as the current through a series combination of an inductance, L, and resistance, R. A large shunt resistance, $R_s$, is used to allow secondary current, $I_s$, to drain the capacitor, even if the pulse current, I, is zero. The pulse circuit model is shown in FIG. 3. As all of the circuit elements are passive, the relationships between voltage drops across the circuit elements result in a linear system of differential equations with constant coefficients. The solutions to these systems are damped trigonometric oscillations if the circuit rings, or exponentially decaying voltage profiles if the circuit is overdamped.

The circuit elements in the model can be determined using experimentally obtained pulse values. The pulse rise time, pulse duration, peak current, and pulse energy are all functions of the circuit element values, and can thus be used to determine these values for the particular pulses encountered in cathodes 1 and 2 of the microdischarge-based pressure sensors. The pulse rise time is expressed as $$t_r = (1 + 2\varepsilon)\frac{L}{R}\left(\ln\frac{1}{\varepsilon} - r\right), \tag{1}$$

where $\varepsilon = L/(CR^2)$ and $r = R/R_s$. The pulse duration is expressed as $$t_p = [(1+\varepsilon)RC]/(1-r) \tag{2}$$

The pulse peak current is $$I_p = \frac{V_0}{R}\left[1 - \varepsilon\ln\left(\frac{1}{\varepsilon e}\right) - r\right], \tag{3}$$

where $V_o$ is the initial applied voltage. The pulse energy is $$Q = \frac{1}{2}\frac{CV_o^2/R}{(1+r)(1+\varepsilon r)}. \tag{4}$$

Figure 4A:
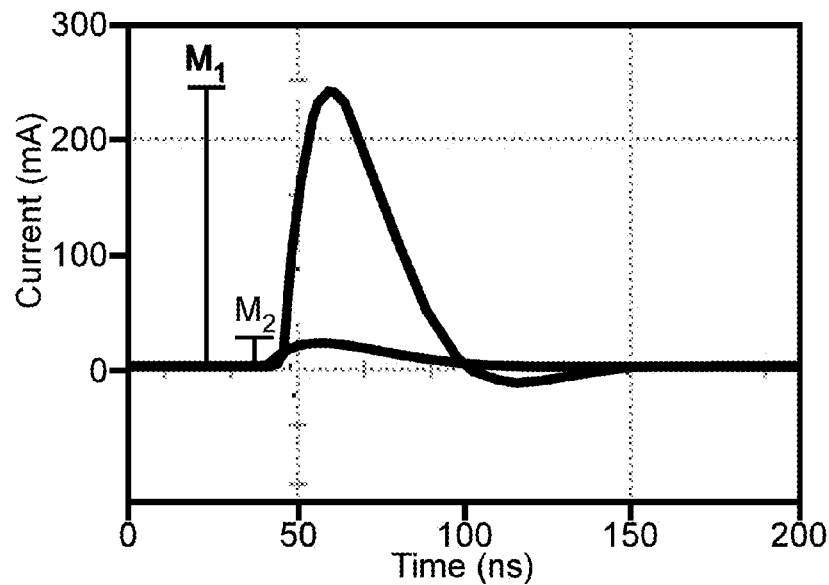
FIG. 4a is a graph depicting the theoretical current pulses in the cathodes of a pressure sensor such as shown in FIG. 1.

FIG. 4a shows the theoretical current pulses in cathodes 1 and 2 of a pressure sensor with electrodes spaced 50 μm apart, 1 mm in diameter, and 125 μm thick at a pressure of 200 Torr. For cathode 1, the pulse rise time is 10 ns, the pulse duration, measured from initiation to the $I_p/e$ time, is 50 ns, and the peak current is 235 mA. For cathode 2, the parameters are 20 ns, 40 ns, and 10.6 mA respectively. Using these parameters and equations 1-3, the values for R, L, and C are obtained numerically for each cathode. Further refinement is possible by fitting to additional experimental results. The circuit elements for cathode 1 in the described sensor are found to be 2.6 kΩ, 25 μH, and 6.8 pF respectively and 48 kΩ 600 μH, and 0.6 pF for cathode 2. The shunt resistance is simulated as a large impedance, 100 kΩ. The predicted current pulses as a function of time are determined through modeling utilizing SPICE. Similar analysis can be applied to determine the circuit elements for various other pressure sensor configurations.

Fabrication

The bulk foil sensor 20 of FIG. 1, which is intended for operation at temperatures up to 1,000° C., uses a quartz substrate 22. Other substrate materials can be used, and with suitable selection of materials, operating temperatures above 1,000° C. can be realized. For the electrodes 24-26, #302 stainless steel is used for several reasons. Primarily, it is robust, inexpensive, easily machinable by micro-electro-discharge machining and photochemical etching, and has a sufficient secondary emission coefficient. Additionally, it is oxidation-resistant at high temperatures and can be heated to 1,420° C. before melting. Alternate refractory metals such as tungsten, molybdenum, and niobium oxidize at high temperatures in air, making them less desirable. Platinum, iridium, and platinum-rhodium are attractive options but are significantly more expensive than stainless steel.

Figure 5:
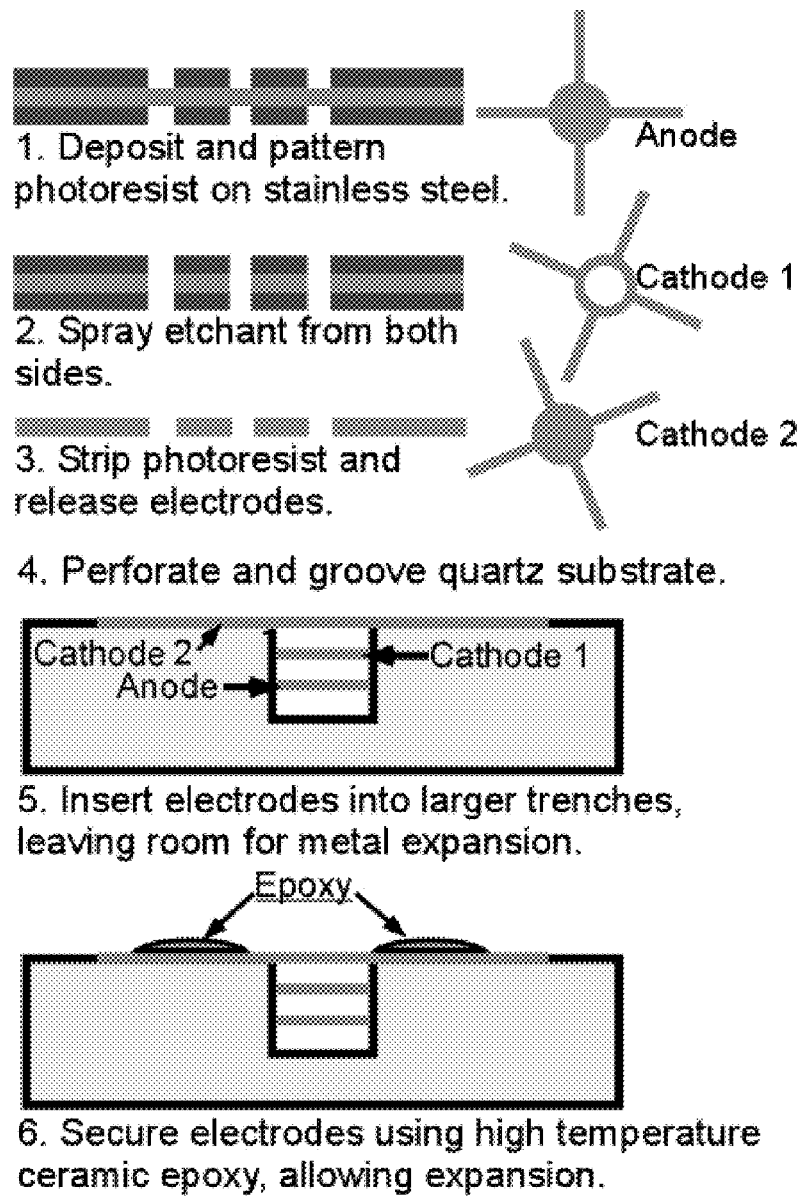
FIG. 5 depicts a process that can be used to manufacture and assemble the three electrodes of the pressure sensor of FIG. 1.

A process of manufacturing and assembling the electrodes 24-26 into the substrate 22 is shown in FIG. 5. The electrodes are lithographically patterned and etched from stainless steel foil, using photochemical machining. This process involves coating a thin sheet of metal with photoresist, exposing the resist, and spraying the sheet with a chemical etchant to dissolve the exposed metal. The exposed metal is completely removed, leaving through-holes in the sheet, and the resist is stripped. This can be done using commercially available services, such as are available from Fotofab of Chicago Ill., USA.

Because the electrodes are integrated into trenches, or recesses, in the monolithic substrate, an arrangement that accommodates the thermal expansion mismatch between the electrodes and substrate. Trenches of specified depths and a through-hole in the center are cut into the planar quartz substrate 22. Both mechanical and wet-etch processes can be used for this purpose. The electrodes are assembled into the trenches, with the circular portions located in the through-hole. The different depths between the various trenches specify the discharge gap spacing, as the electrodes lie flush with the bottom of the trenches. Ceramic epoxy holds the electrode lead and support arms in place, without adhering to the stainless steel. This allows the leads and supports to expand separately from the quartz chip and the ceramic epoxy without buckling. High temperature-compatible wires are soldered to the electrodes and the solder is encased in ceramic. This ceramic keeps the solder in position so it maintains electrical contact, even at high temperatures.

Figure 6:
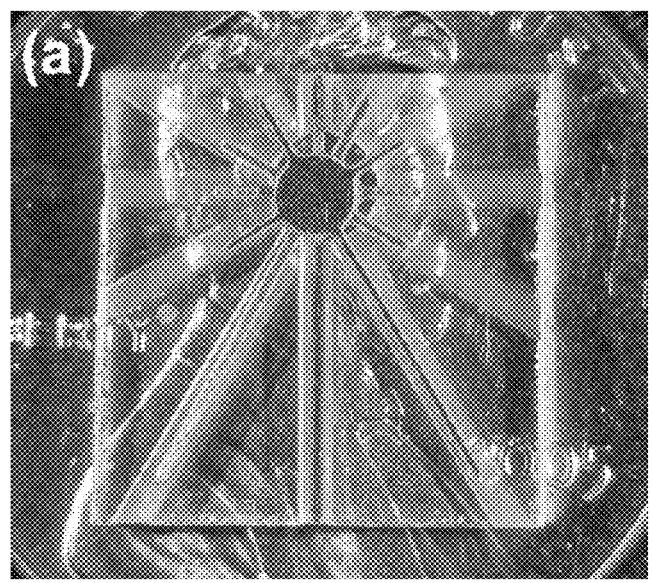
FIG. 6 is a photograph depicting the relative size of a fabricated pressure sensor of the type shown in FIG. 1.

The sensitivity, pressure dynamic range, and temperature dynamic range depend on a variety of dimensional parameters, including inter-electrode spacing, electrode diameter, and the cathode thickness. (Cathode thickness effects electrode spacing.) The anode/cathode spacing in these sensors is set to produce measurable results up to 1,000° C. (The sensors are designed to function with an applied voltage of 1,000 V; altering the voltage results in different sensitivities.) A typical bulk foil design with electrodes spaced 50 μm apart, 1-2 mm in diameter, and 125 μm thick is shown in FIG. 6. These sensors have active areas of 0.8-3 mm$^2$ and are fabricated on 1 cm$^2$ chips.

Experimental Results

Figure 7:
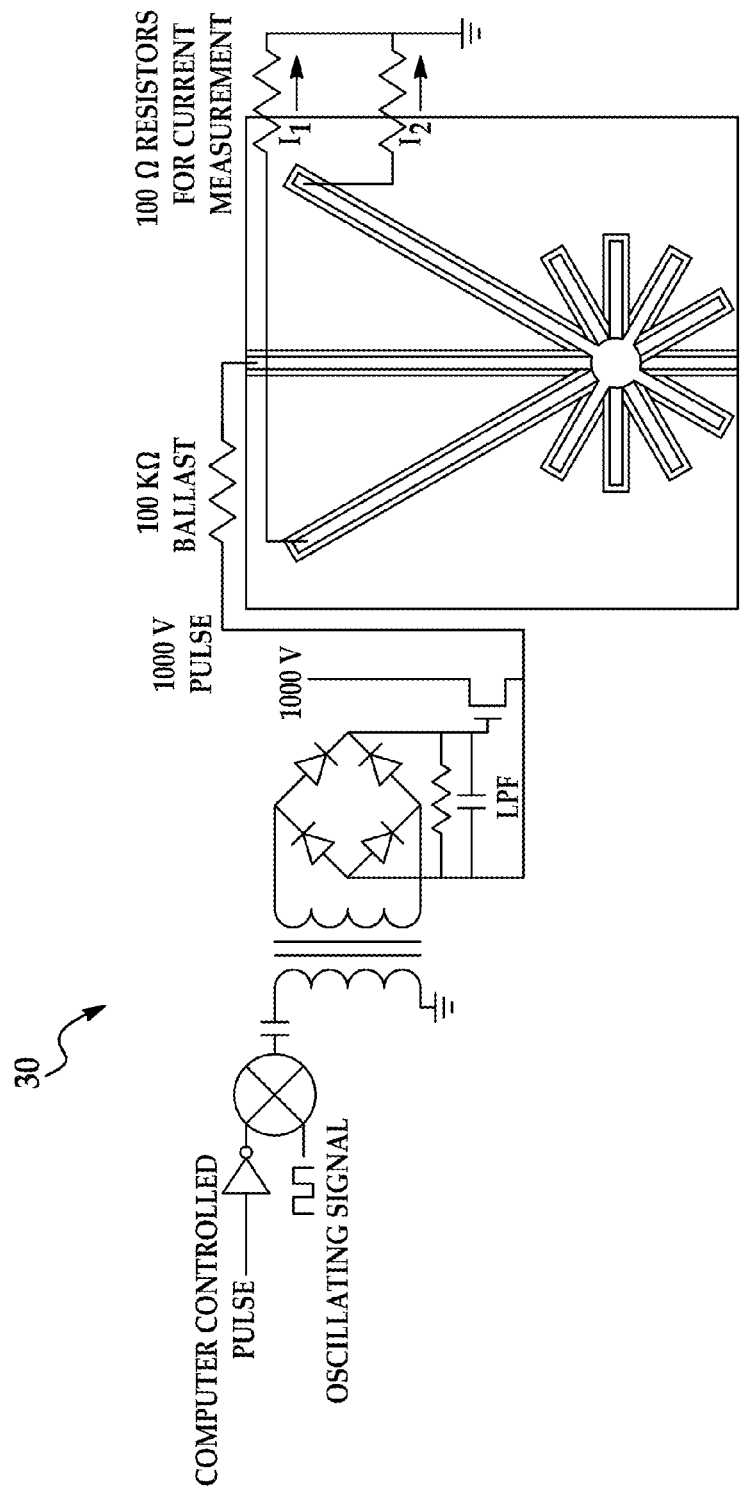
FIG. 7 is a schematic depicting a single ended, transformer coupled, gate drive circuit for use in applying measurement pulses to the pressure sensor of FIG. 1.

Bulk foil pressure sensors were fabricated and tested at various temperatures up to 1,000° C., measuring pressures between 10 Torr and 2,000 Torr. This pressure range is exemplary only and devices constructed according to the teachings herein can be used in pressure measurements both above and below this range. Pulses, 1-20 ms in duration, were applied at a rate of 2-10 Hz to the anodes of the sensors with positive voltages between 700 V and 1,000 V. As shown in FIG. 7, a computer controlled, single ended, transformer coupled, gate drive circuit 30 created the pulses. Other suitable drive circuits can be used, and various such circuits are known to those skilled in the art. The pulses consumed between 168 μJ and 6 mJ each. A current limiting ballast resistor was used in series with the anode, and the pressure sensor further includes a measurement circuit having 100-Ω resistors in series with each cathode to measure current. The measurement circuit can include a differential current measurement circuit (not shown) used to determine the magnitude of the differential peak current which can be outputted by the sensor as an indicator of sensed ambient pressure. Circuitry for determining the differential peak currents based on the voltages across the 100-Ω measurement resistors is known to those skilled in the art.

Figure 4B:
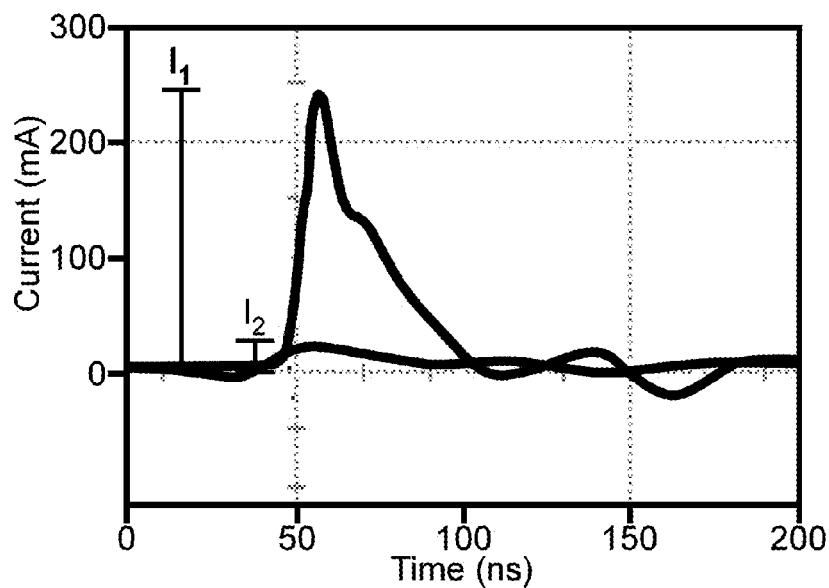
FIG. 4b is a graph depicting experimentally-obtained cathode current pulses from a fabricated pressure sensor of the type shown in FIG. 1.

In the fabricated devices under test, the current pulses were observed in each cathode. The transient current pulses were approximately 40-100 ns in duration, with amplitudes of 1.3 mA to 2.85 A in the bulk foil sensors, varying with temperature and pressure. The experimentally obtained pulses in both cathodes are shown in FIG. 4b. They demonstrated damped trigonometric current oscillations. The sum of the measured cathode current pulse peaks for the bulk foil device is presented in FIG. 8a. At each temperature, this sum conforms to the equation:

$$I_{pk1}+I_{pk2}=C_1 \cdot \ln(p)-C_2 \tag{5}$$

Figure 8A:
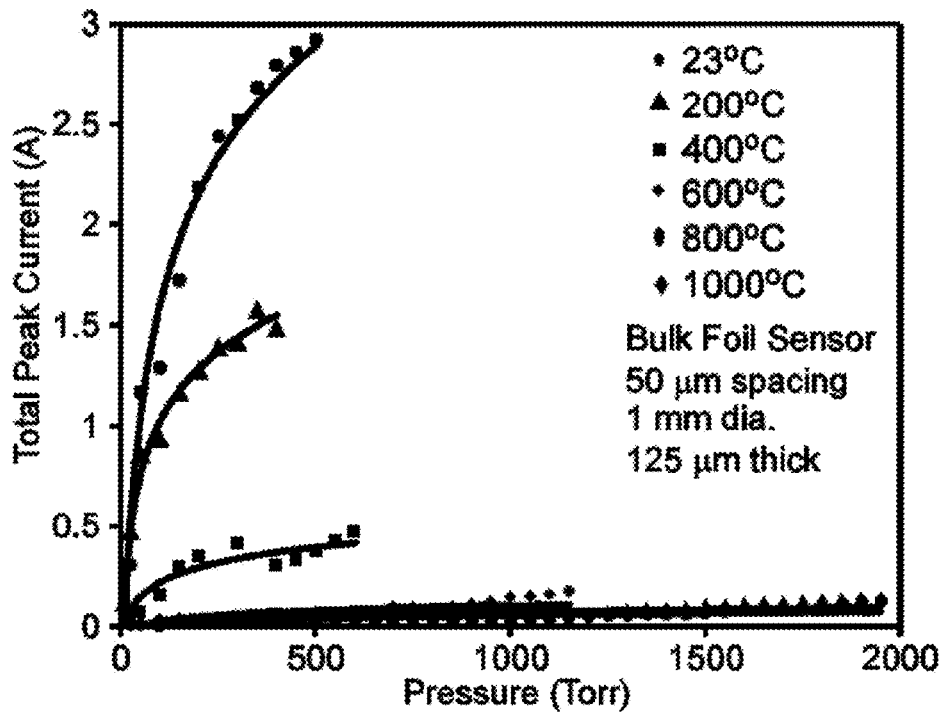
FIG. 8a is a graph of the sum of the measured cathode current pulse peaks from a fabricated pressure sensor of the type shown in FIG. 1.
Figure 8B:
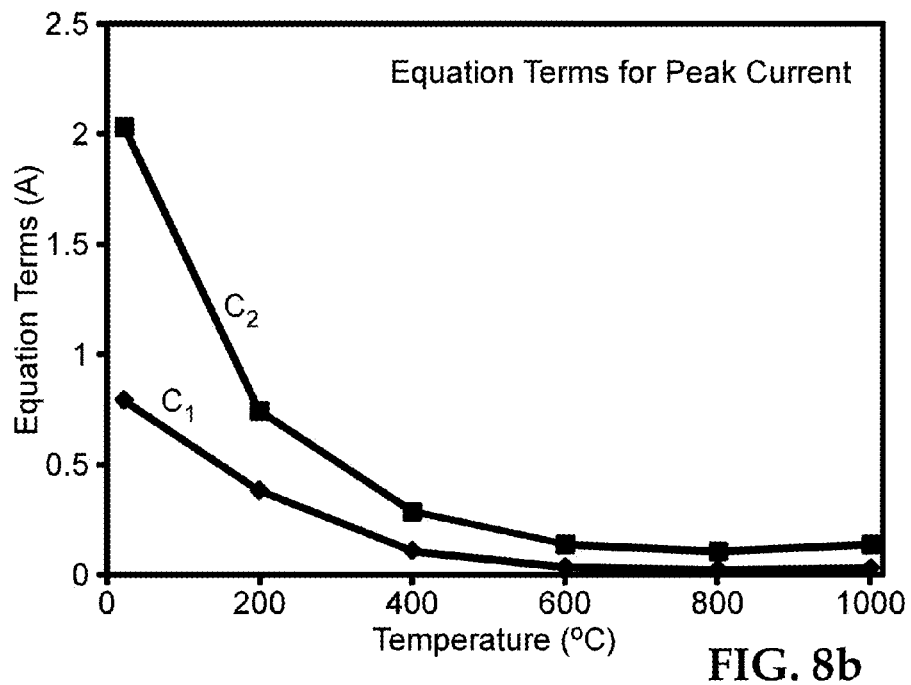

The terms $C_1$ and $C_2$, determined by a least-squares fit to the measured data in FIG. 8a, are plotted in FIG. 8b as a function of temperature. At temperatures greater than 600° C., terms $C_1$ and $C_2$ saturate, indicating the total cathode peak current becomes less dependent on temperature but remains dependent on pressure at higher operating temperatures.

Figure 9:
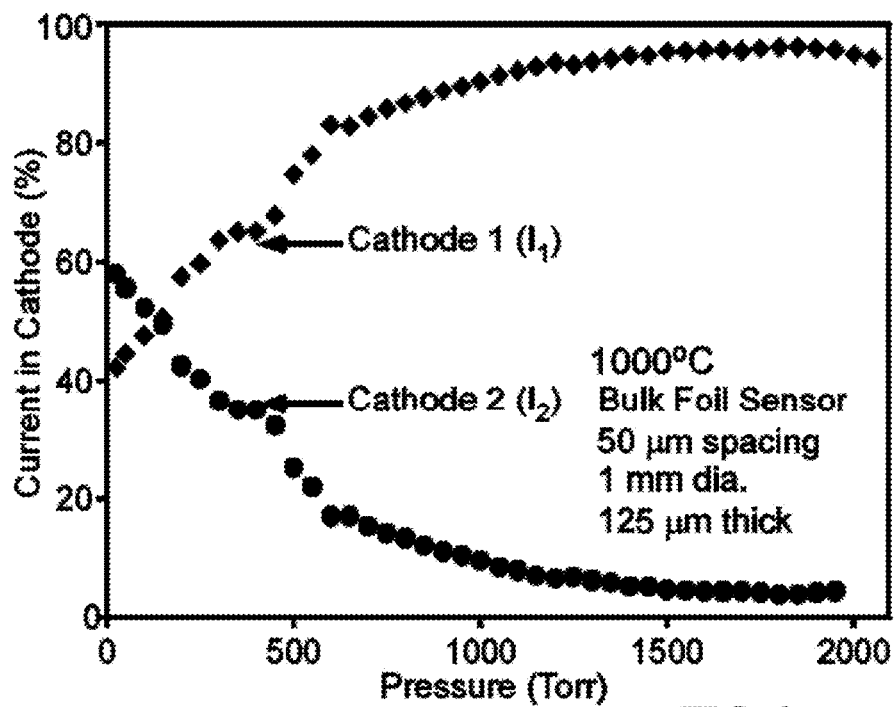
FIG. 9 is a graph of fractional cathode currents measured from a fabricated pressure sensor of the type shown in FIG. 1.
Figure 10A:
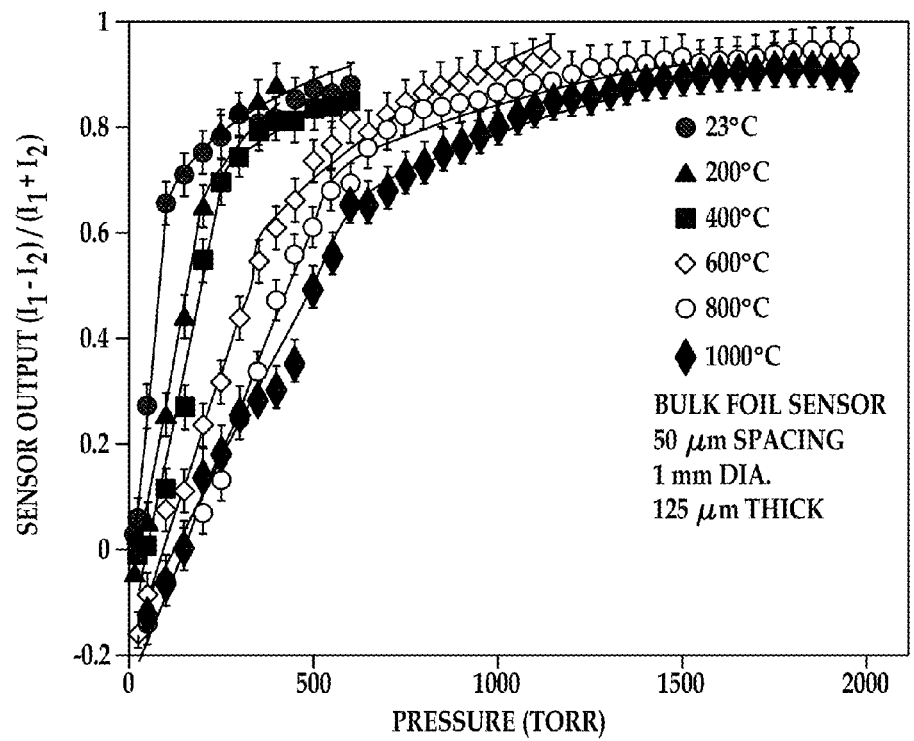
FIG. 10a is plot at different temperatures of a typical differential peak current output for electrodes spaced at 50 μm apart for a pressure sensor of the type shown in FIG. 1.
Figure 10B:
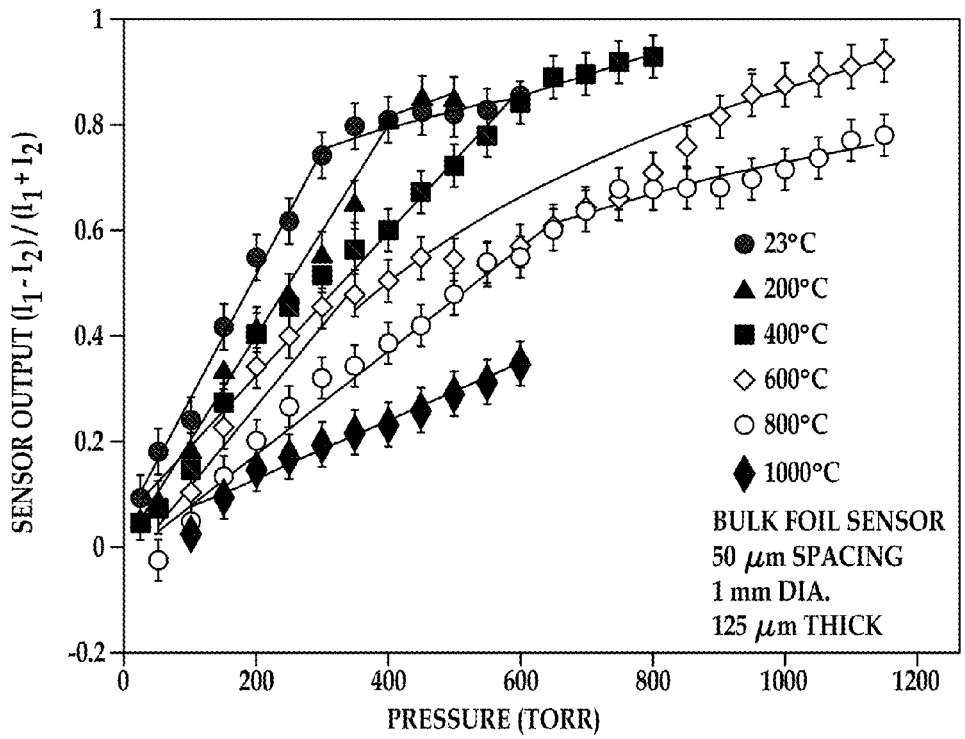
FIG. 10b is plot at different temperature of a typical differential peak current output for electrodes spaced at 100 μm apart for a pressure sensor of the type shown in FIG. 1.
Figure 11A:
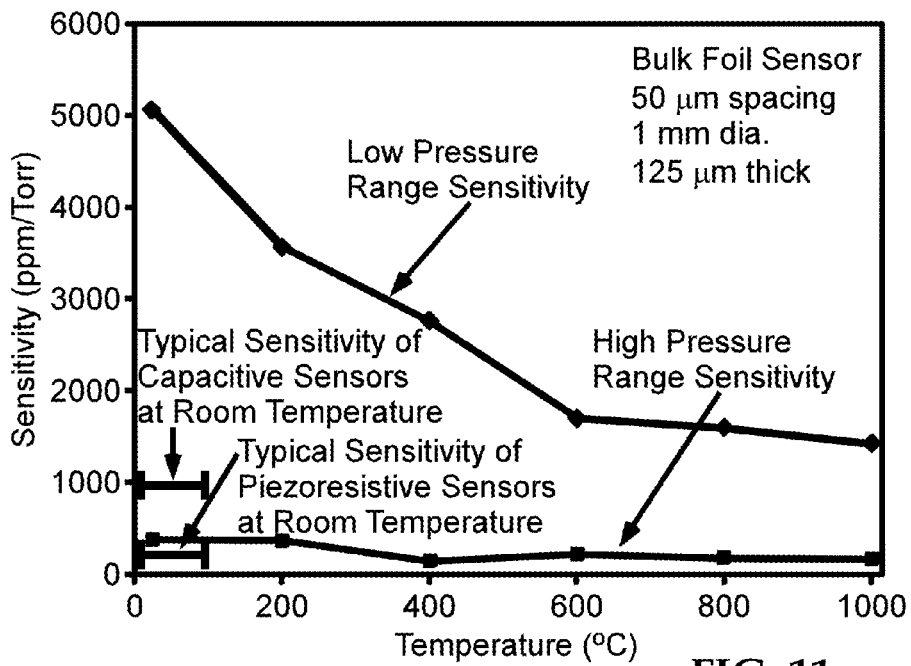
FIG. 11a is a plot of low and high pressure range sensitivity over an operating range of temperatures for electrodes spaced at 50 μm apart for a pressure sensor of the type shown in FIG. 1.
Figure 11B:
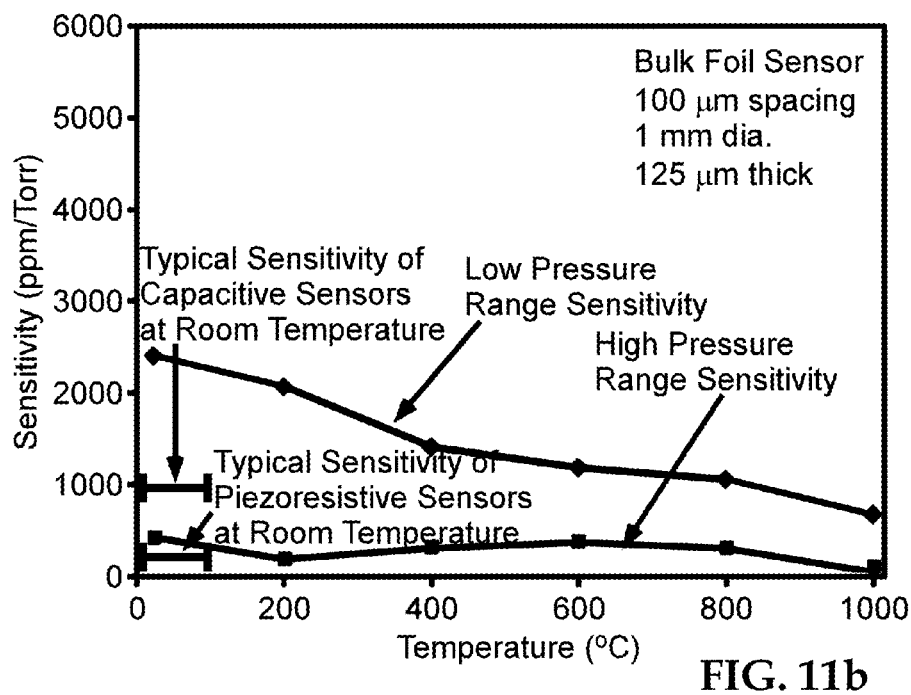
FIG. 11b is a plot of low and high pressure range sensitivity over an operating range of temperatures for electrodes spaced at 100 μm apart for a pressure sensor of the type shown in FIG. 1.

A nitrogen filled chamber with temperature and pressure control was used to test the bulk foil sensors. FIG. 9 shows fractional cathode currents, at 1,000° C., for a sensor design with electrodes that were spaced 50 μm apart, 1 mm in diameter, and 125 μm thick. As noted, the output of the sensor is the differential peak current between two cathodes, expressed as a fraction of the total peak current. The typical output for this sensor is shown in FIG. 10a. FIG. 10b presents the typical output from a sensor design with electrodes spaced 100 μm apart, 1 mm in diameter, and 125 μm thick. The sensors demonstrate two regions of sensitivity (similar in some sense to touch-mode capacitive pressure sensors). At low pressures the response is highly linear, whereas at high pressures it conforms to equation 5. The transition between these two regions rises from about 100 Torr at room temperature to about 500 Torr at 1,000° C. The average sensitivities in the low pressure and high pressure operating regions of these sensors are shown in FIGS. 11a and 11b for electrode spacings of 50 μm and 100 μm, respectively, as functions of temperature. One sensor design typically demonstrated the maximum lower pressure sensitivity, 5,420 ppm/Torr, as well as the maximum higher pressure sensitivity, 500 ppm/Torr. Other design variations were also explored and the typical results are listed in Table I. The minimum average temperature coefficient of sensitivity was −550 ppm/K.

TABLE I

| Sensor Parameters | Max Low Pressure Sensitivity (ppm/Torr) | Max High Pressure Sensitivity (ppm/Torr) | Dynamic Range (Torr) | Temp. Coeff. of Sensitivity (ppm/K) |
|---|---|---|---|---|
| Example 1 | | | | |
| D = 1 mm<br>W = 125 µm<br>G = 50 µm | 5,060 | 380 | <u>2,000</u> | −650 |
| Example 2 | | | | |
| D = 1 mm<br>W = 125 µm<br>G = 100 µm | 2,170 | 220 | 1,150 | <u>−550</u> |
| Example 3 | | | | |
| D = 2 mm<br>W = 125 µm<br>G = 100 µm | <u>5,420</u> | <u>500</u> | 900 | −925 |

Sensitivity, dynamic range, and the temperature coefficient of sensitivity are metrics used to compare microdischarge-based pressure sensor designs to one another and other pressure sensors. The performance of three different sensor designs are shown in Table I, with the highest performance in each category being underlined. The data in the table represents typical operation of the FIG. 1 sensor design.

The sensors constructed in accordance with the embodiment of FIG. 1 demonstrate a negative temperature coefficient of sensitivity. For example, a sensor with electrodes spaced 50 µm apart, 1 mm in diameter, and 125 µm thick has a sensitivity in the low pressure region of 5,060 ppm/Torr at 23° C. and 1,420 ppm/Torr at 1,000° C. There are a number of possible contributors to the temperature coefficient of sensitivity, ranging from changes in the nature of the microdischarge to structural effects such as minor variations in electrode separation caused by expansion mismatch with the substrate. For comparison, typical piezoresistive and capacitive pressure sensors have sensitivities of 100-1,000 ppm/Torr respectively, and temperature coefficients of sensitivity of ±1,000 ppm/K to ±5,000 ppm/K.

In nitrogen environments, coating of the electrode surfaces with contaminating thin films is not a primary concern, in these sensors. In the past, microdischarges have been used to, and can unintentionally, coat electrode surfaces in reactive environments. However, with discharges of sufficient energy, thin films are sputtered off the electrodes. This is demonstrated through the successful use of titanium electrodes, which form native titanium oxide layers in air. Radio frequency discharges are also utilized to remove coatings.

Additional Embodiments

Figure 12:
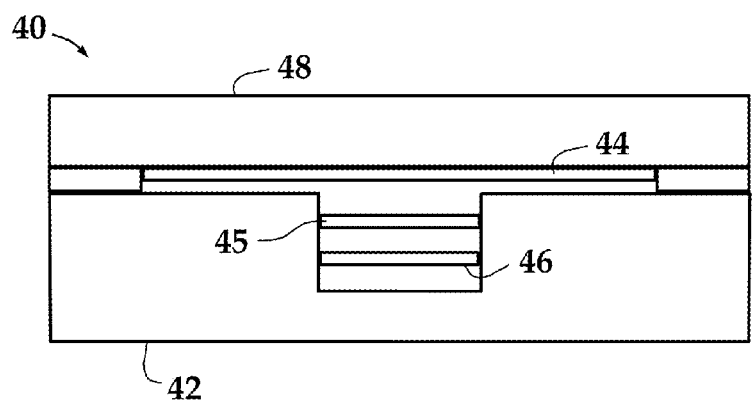
FIG. 12 is a diagrammatic view of the cross-section of a second embodiment of a microdischarge-based pressure sensor that is encapsulated for use in liquid or corrosive environments.

In general, microdischarge-based pressure sensors should be calibrated for the gas environment in which they operate. To permit operation in variable environments that may additionally contain corrosive gases or even liquids, the pressure sensors can be encapsulated within a sealed cavity with a flexible diaphragm. An example of this is shown in FIG. 12. The sealed cavity could contain pure nitrogen, helium, or other gas in which the discharges would be created. In one sealed embodiment, the external fluidic pressure would be transferred to the encapsulated gas through the diaphragm, taking advantage of the high sensitivity of the pressure sensor. In another embodiment, the electrode spacing can be adjusted based on external pressure such that the current measurements in the electrodes could be used to detect gap spacing changes as an indication of external pressure. Thus, for example, as shown in FIG. 12, there is an encapsulated pressure sensor 40 that includes a substrate 42, anode 44, middle annular cathode 45, lower cathode 46, and a diaphragm 48 made of a thin quartz layer or some other sufficiently flexible material. By having the anode attached to the upper diaphragm 48, changes in external pressure operate to flex the anode, thereby altering the gap spacing between the anode and each cathode. This can have a measurable change on the relative currents in the cathodes which can be measured to thereby determine the external pressure.

Figure 13:
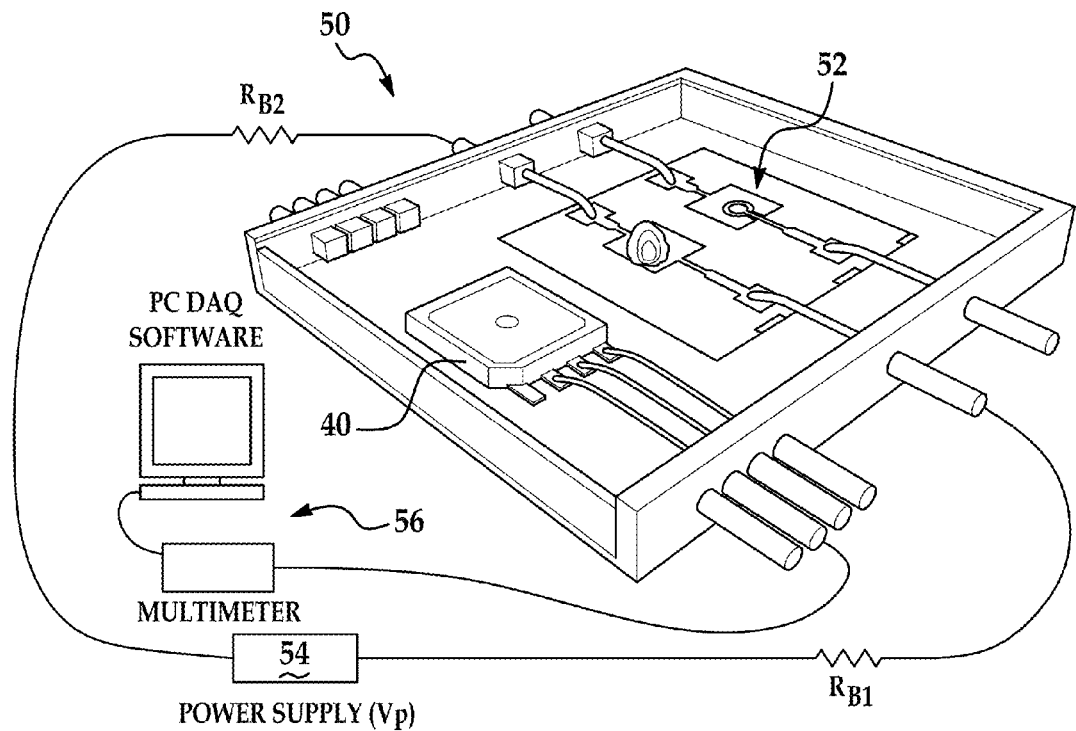
FIG. 13 is a partially schematic view of a sealed commercial packaging design for a pressure sensor such as shown in FIG. 12 that includes a micro-ion sputter pump to provide a partial vacuum within the sealed package.

In any of the sealed embodiments, known techniques can be used to initially set or otherwise control the internal pressure of the cavity. For example, as shown in FIG. 13, a micro sputter ion pump (µSIP) can be used to create a partial vacuum within the sealed device. FIG. 13 depicts schematically a commercial package 50, commercial pressure sensor 40, micro-SIPs 52, power 54, and readout circuitry 56. $R_{B1}$ and $R_{B2}$ are ballast resistors of varied resistance which limit the current flowing between the anode and cathode. Further details of such an approach are described in Wright and Gianchandani, *Controlling Pressure in Microsystem Packages By On-chip Microdischarges Between Thin-Film Titanium Electrodes*, J. Vac. Sci. Technol. B 25(5), September/October 2007, pp. 1711-1720. There are other known approaches for tuning or otherwise controlling the internal pressure, such as by use of a thin-film getter, and those skilled in the art can implement these or other suitable approaches using existing technology.

Figure 17:
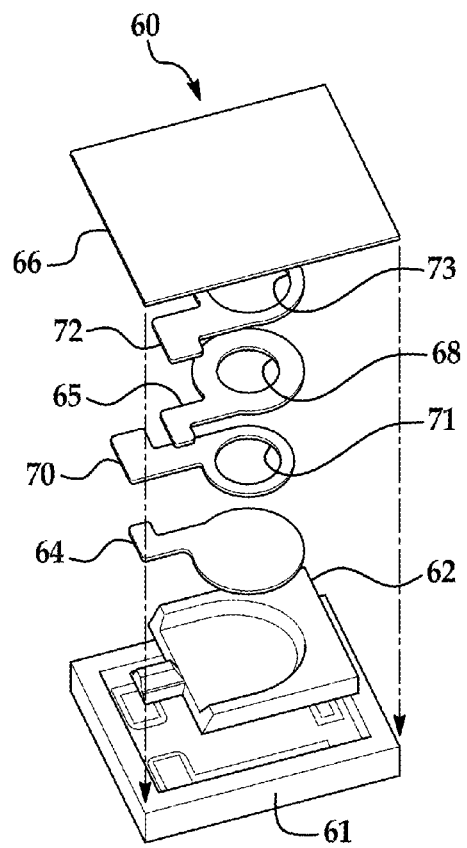
FIG. 17 is an exploded view of a third embodiment of a microdischarge-based pressure sensor that is encapsulated for use in liquid or corrosive environments.
Figure 19:
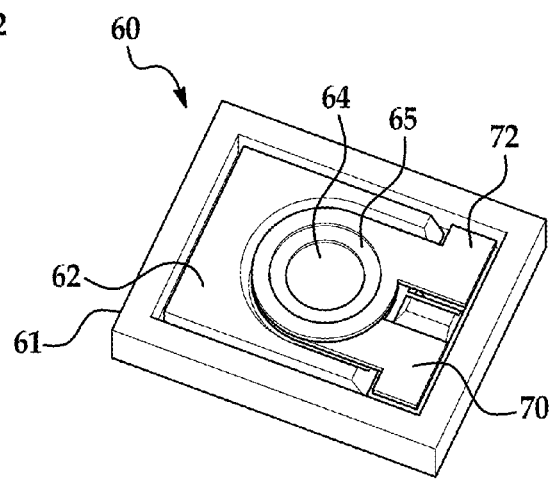
FIG. 19 is a perspective view of the assembled components of the sensor of FIG. 14 prior to sealing of the diaphragm over the package.
Figure 18:
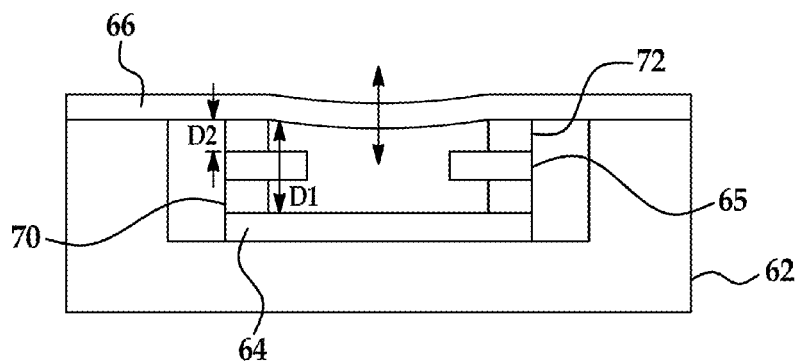
FIG. 18 is a diagrammatic view of a cross-section of the pressure sensor of FIG. 14 showing deflection of the diaphragm due to external pressure.

Another embodiment 60 of a sealed microdischarge-based pressure sensor is shown in FIGS. 17-19. The pressure sensor 60 is similar to the sensor 40 of FIG. 12 in that it is a sealed design that includes a single anode and two cathodes, one of which is a middle electrode with an circular opening. However, in this embodiment, the sensor 60 is packaged in a commercial Kyocera™ package 61 with the electrodes 64-66 supported in a Pyrex™ substrate 62. The electrodes are stacked using two dielectric spacers 70, 72 to maintain inter-electrode spacing and provide electrical isolation. The middle electrode (cathode 65) has a central opening 68, and the dielectric spacers 70, 72 as well have respective circular openings, with the lower spacer 70 having an opening 71 that is larger than that of the cathode opening 68 and the upper spacer 72 having an even larger opening 73. Anode 64 is positioned at the bottom, as in the first embodiment, and its second electrode 66 is an upper, deflecting diaphragm that is sealed over the package 61.

The dielectric Pyrex substrate 62 is used within the package 61 to maintain the position and spacing between the electrodes 64, 65 and diaphragm 66. Each electrode 64-66 has a single lead for electrical contact to a package feedthrough (not shown). A microdischarge chamber exists in the center of the package through the openings 68, 71, 73 of the center electrode and spacers. As shown, the anode 64 is disk-shaped and serves as the bottom of the chamber while the center electrode is torus-shaped with its central opening 68 allowing the discharges to exist between the bottom anode and both cathodes. The top cathode 66 presents a disk-shape surface due to the opening 73 in the upper spacer 72, with the discharges thereby being confined between the anode 64 and upper cathode 66.

The pressure sensor 60 may be operated as discussed above by measuring changes in current distribution of pulsed DC microdischarges between the anode and two cathodes. The distal diaphragm cathode 66 (cathode 2) deflects due to external pressure, changing the inter-electrode spacing, as shown in FIG. 18.

The gas pressure in the sealed package remains relatively constant because the cavity volume remains relatively unchanged by the diaphragm displacement. The high external pressure causes a great deal of initial displacement and additional pressure variations cause only small displacement changes. These changes can be measured directly using the microdischarge current distribution, but do not alter the internal package pressure significantly. Thus measurements of the internal package pressure are less sensitive than measurements of the diaphragm displacement.

Finite element analysis (ANSYS®) is used for diaphragm design, considering spacer compression and diaphragm deflection. Options for the diaphragm 66 range from 25-μm-thick nickel foil for high sensitivity to cold-rolled 125-μm-thick stainless steel for very-high pressure operation. Other materials and thicknesses can be used. Maximum achievable pressure for various diaphragms of specified thicknesses and materials are outlined in Table II.

TABLE II

| Material | Thickness (μm) | Deflection (μm) | Max. Stress (MPa) | Max. Pressure (psi) |
|---|---|---|---|---|
| Nickel | 25 | 0.63 | 59 | 100-200 |
| 304 SS | 25 | 2.4 | 215 | 400-500 |
| 60% Hardened 304 SS | 125 | 7.3 | 1,027 | 20,000 |

Sensor characteristics such as the sensitivity, pressure dynamic range, and temperature dynamic range depend on a variety of dimensional parameters, including inter-electrode spacing, electrode diameter, and the cathode thickness. (Cathode thickness effects sheath sizes as well as electrode spacing). The sensor 60 is designed to function with an applied voltage of 500 V; altering the voltage results in different sensitivities.

Sensor 60 can be formed by stacking bulk-metal electrodes 64, 65 and dielectric spacers 70, 72 within the dielectric substrate 62. This substrate 62 is then enclosed in a commercial package 61 by bonding the metal diaphragm/cathode 66 to the top of the package 61, as shown in FIG. 17. The package 61 used for the sensor 60 is designed for crystal use and has external dimensions of 2.05×1.65×0.5 mm3 (Kyocera, Japan). The package has two internal feedthroughs with internal goldcoated contact pads, for the anode 64 and cathode 65. A third goldcoated contact pad on the rim makes electrical contact to cathode 66. The Pyrex™ substrate can be a 175-μm thick. The sidewalls of this substrate 62 and the recessed area in its center can be formed using a Micro Abrasive Jet (MAJ) process, also known as powder abrasive blasting (such as it available from Bullen Ultrasonics, Eaton Ohio). The substrates can be formed from Schott D263 borosilicate glass due to its machinable and dielectric properties. The MAJ process is used as it allows a 100 μm deep recess to be etched into the center of the substrate 62, in which the microdischarge chamber is housed.

The 25-μm-thick-bulk-foil electrodes 64, 65 can have outer diameters of 800 μm and are patterned from nickel for several reasons. Primarily it is robust, inexpensive, easily machinable by microelectro-discharge machining and photochemical etching, and has a sufficient secondary emission coefficient (i.e. secondary electrons per incident ion in a nitrogen ambient). The electrodes are lithographically patterned and etched from nickel foil using photochemical machining. This process can be done as in FIG. 5, and involves coating a thin sheet of metal with photoresist, exposing the resist, and spraying the sheet with a chemical etchant to dissolve the exposed metal. The exposed metal is completely removed, leaving through-holes in the sheet, and the resist is stripped (ChemArt Company, Lincoln R.I.). Electrical contact is made between the nickel electrodes and the gold contact pads of the package by conductive silver epoxy. The epoxy also serves to physically secure the electrodes.

The 25-μm-thick-dielectric torus-shaped spacers 70, 72 serve to electrically isolate the electrodes 64, 65 from one another and from the diaphragm electrode 66 to allow microdischarges to be created in the center through-holes. They also define the inter-electrode spacing. Kapton can be advantageously used due to its dielectric properties and ability to withstand 400° C. temperatures without significant dielectric loss. The spacers can be laser cut from a Kapton sheet for precision (Tech-Etch, Plymouth Mass.).

The diaphragm electrode 66 is bonded to the package 61 using laser welding or solder bonding. When solder bonding, a Sn/Pb foil bond ring is used between the package and diaphragm. These bonding procedures hermetically seal the device within the package 61. The diaphragm 66 rests on the electrode/spacer stack to strictly define the maximum inter-electrode spacing.

A sensor 60 as described above was fabricated and tested at pressures up to 15 atm (200 psi) in dielectric oil. Compressed nitrogen was used to pressurize the oil at lower pressures while a hydraulic jack was used at higher pressures. Pulses 1 ms in duration with 500 V and 25 μJ per pulse were applied. The applied voltage pulses resulted in current pulses through each cathode. The transient current peaks were approximately 100-200 μs in duration, with amplitudes of 5-50 mA, varying with pressure. Pressure was determined by measuring the difference between the fractional current in each cathode. As noted, the output of the sensor is the differential peak current between two cathodes, expressed as a fraction of the total peak current. The diaphragm deflection saturated at 10 atm. To create a stiffer diaphragm, a nickel diaphragm was coated with a 75-μm-thick layer of epoxy. This second sensor with a stiffened diaphragm provided a sensitivity of 2,864 ppm/psi (42,113 ppm/atm.) and operated up to 15 atm.

A logical progression for these sensors is the use of three, or more, cathodes to simultaneously enhance both sensitivity and dynamic range (albeit at the cost of increasing lead count at the circuit interface). This has been explored in a preliminary manner—devices with three or more cathodes were fabricated, but the signal output involved only two of the cathodes. The signal generated from two cathodes of a bulk foil device that had three cathodes spaced 100 μm apart, 3 mm in diameter, and 50 μm thick, provides a relatively high sensitivity of 5,000 ppm/Torr, but not surprisingly, a compromised dynamic range of only 300 Torr.

Figure 14:
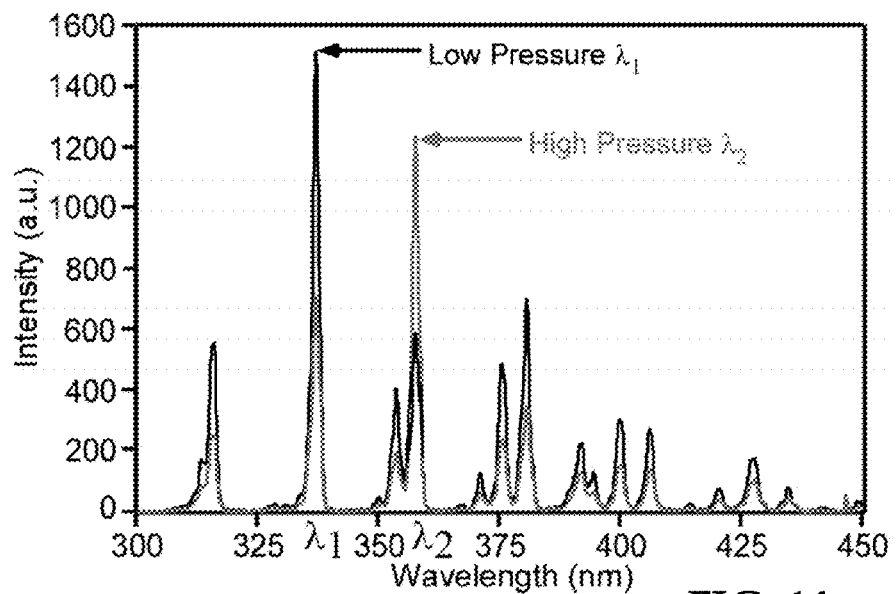
FIG. 14 depicts an example of spectra showing pressure-dependent changes in wavelength, which can be used for spectral-based detection of pressure changes from the microdischarge.

Apart from hardwired measurement of cathode current(s) to determine pressure, other techniques could be used to detect pressure effects on the microdischarge. For example, pressure can be detected by spectral sensing through differential measurements of emitted spectral components of the discharge. FIG. 14 depicts an example of spectra showing a change in variation of $\lambda_1$ vs. $\lambda_2$ with pressure. By observing the relative strengths of $\lambda_1$ vs. $\lambda_2$ a differential measurement can be obtained while reducing the influence of discharge variations. In another embodiment, this spectral measurement approach can be used with a sealed cavity sensor using two reference gases that are affected differently by pressure. Other such approaches will become apparent to those skilled in the art.

Figure 15:
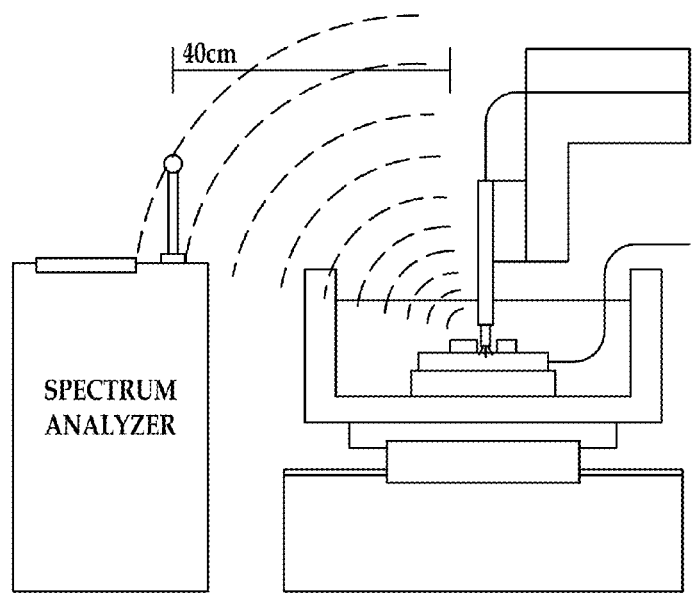
FIG. 15 shows a diagram of a pressure sensor discharge along with wireless monitoring of the emitted RF signal.
Figure 16:
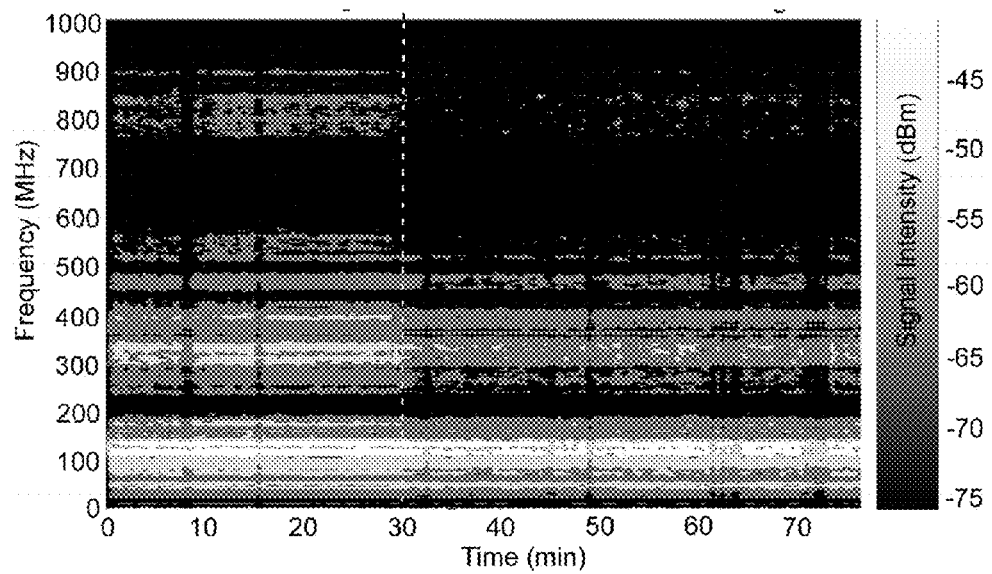
FIG. 16 is a graph showing an exemplary received wireless RF signal.

For example, another spectral approach utilizes wireless monitoring of pressure using RF signals generated by the discharges. FIG. 15 shows a diagram of a pressure sensor discharge along with wireless monitoring of the emitted RF signal. FIG. 16 depicts an exemplary received wireless RF signal. The sensing and spectral variations of such an emitted signal in a micro-electro-discharge machining (µEDM) system are described in Richardson and Gianchandani, *Real-Time Wireless Monitoring of Workpiece Material and Debris Characteristics in Micro-Electro-Discharge Machining*, Proc. of MEMS 2008, Tucson, Ariz., USA, Jan. 13-17, 2008, pp. 379-382.

CONCLUSIONS

The results indicate microdischarge-based pressure sensors could be promising for use at high temperatures, at least up to 1,000° C., over a pressure range that extends from vacuum to many tens of atmospheres. It is expected these sensors can potentially operate at temperatures below room temperature and over larger dynamic pressure ranges. They provide an electrical readout, avoiding an intermediate transduction step, which can be convenient in some cases. The active areas for these devices are small enough to permit hybrid or monolithic integration with other components that constitute functional microsystems. The sensitivity achieved compares favorably with conventional piezoresistive and capacitive pressure sensors of comparable size. Moreover, encapsulating the devices within a sealed cavity with a flexible diaphragm would permit them to be operated in a broad range of environments.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, multiple anodes can be used in lieu of or in addition to multiple cathodes; however, anode current can have excessive pressure dependence because of the high mobility of electrons that dominate it. This high sensitivity results in relatively small dynamic ranges, thereby limiting the utility of multi-anode configurations. Also, although multiple cathodes are used in the illustrated embodiment for differential sensor output, suitable pressure measurement could also be achieved for particular applications using a single cathode pressure sensor that depends on absolute current readings from the cathode. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A microdischarge-based pressure sensor, comprising:
a plurality of electrodes including an anode having a first surface, a first cathode having a second surface disposed in a parallel, spaced relationship relative to said first surface, and a second cathode, wherein said anode and said first cathode are sized such that a microdischarge chamber exists between said anode and said first cathode having a generally uniform first gap spacing across said first and second surfaces;
a drive circuit connected to said electrodes, said drive circuit being operable to apply voltage pulses to said electrodes sufficient to cause a microdischarge in said chamber between said electrodes; and
a measurement circuit that permits sensing of transient current pulses flowing through at least one of said electrodes in response to said voltage pulses, wherein said measurement circuit is configured to receive current pulses via a first output coupled to said first cathode and other current pulses via a second output coupled to said second cathode, said measurement circuit configured to determine an ambient pressure based on a differential current measurement based on the current pulses from said first and second cathodes.

2. A pressure sensor as defined in claim 1, wherein said second cathode is disposed in a parallel, spaced relationship relative to said anode such that said second cathode is separated from said anode by a second gap spacing that is greater than the first gap spacing.

3. A pressure sensor as defined in claim 2, further comprising a monolithic substrate supporting said anode and said first and second cathodes in said spaced relationships.

4. A pressure sensor as defined in claim 2, wherein said measurement circuit comprises circuitry for measurement of transient current pulses in each of said first and second cathodes.

5. A microdischarge-based pressure sensor, comprising:
a plurality of electrodes including an anode having a first surface and a cathode having a second surface disposed in a parallel, spaced relationship relative to said first surface, wherein said anode and said cathode are sized such that a microdischarge chamber exists between said anode and said cathode having a generally uniform first gap spacing across said first and second surfaces;
a drive circuit connected to said electrodes, said drive circuit being operable to apply voltage pulses to said electrodes sufficient to cause a microdischarge in said chamber between said electrodes; and
a measurement circuit that permits sensing of transient current pulses flowing through at least one of said electrodes in response to said voltage pulses,
wherein said cathode comprises a first cathode, and wherein said pressure sensor further comprises a second cathode disposed in a parallel, spaced relationship relative to said anode such that said second cathode is separated from said anode by a second gap spacing that is greater than the first gap spacing,
wherein said first surface of said anode is planar and disk-shaped and said second surface of said first cathode is planar and annular-shaped, and wherein said second cathode has a third surface that is planar and disk-shaped, and wherein said planar surfaces are in an aligned, stacked configuration with said first cathode being located between said anode and said second cathode such that a microdischarge between said anode and said second cathode extends through a central opening in said annular second planar surface of said first cathode.

6. A pressure sensor as defined in claim 5, further comprising a substrate including a plurality of recesses each having a different depth and each supporting one of said electrodes, wherein said gap spacings between electrodes are determined by the depths of said recesses.

7. A pressure sensor as defined in claim 6, wherein said substrate and said electrodes have different coefficients of thermal expansion and wherein said recesses are larger than said electrodes such that said electrodes can expand freely within said recesses while maintaining said gap spacings.

* * * * *